US012424179B2

(12) United States Patent
Da Silva et al.

(10) Patent No.: US 12,424,179 B2
(45) Date of Patent: Sep. 23, 2025

(54) IMAGE DISPLAY SYSTEM COMPRISING AN EXTENDED DISPLAY SURFACE, ASSOCIATED IMAGE DISPLAY METHOD, ASSOCIATED SOFTWARE AND PROGRAMMABLE ELECTRONIC DEVICE

(71) Applicant: FAURECIA CLARION ELECTRONICS EUROPE, Paris (FR)

(72) Inventors: Edouard Da Silva, Herblay (FR); Romain Feilleux, Epinay sur Seine (FR); Oussama Haddad, Paris (FR)

(73) Assignee: FAURECIA CLARION ELECTRONICS EUROPE, Paris (FR)

( * ) Notice: Subject to any disclaimer, the term of this patent is extended or adjusted under 35 U.S.C. 154(b) by 0 days.

(21) Appl. No.: 18/480,326

(22) Filed: Oct. 3, 2023

(65) Prior Publication Data
US 2024/0112642 A1    Apr. 4, 2024

(30) Foreign Application Priority Data

Oct. 3, 2022   (FR) ................................ FR 22 10089

(51) Int. Cl.
*G09G 3/34*       (2006.01)
*B60K 35/00*     (2024.01)
(Continued)

(52) U.S. Cl.
CPC .............. *G09G 3/342* (2013.01); *B60K 35/00* (2013.01); *B60K 35/29* (2024.01); *B60K 35/81* (2024.01);
(Continued)

(58) Field of Classification Search
CPC .............. G09G 3/342; G09G 2380/10; G09G 2300/026; G09G 2340/0407;
(Continued)

(56) References Cited

U.S. PATENT DOCUMENTS 11,450,297 B1* 9/2022 Sprague .................... G09G 3/32
2013/0033503 A1 2/2013 Besnard et al.
(Continued)

FOREIGN PATENT DOCUMENTS

FR          3084935 A1    2/2020

OTHER PUBLICATIONS

French Search Report corresponding to application FR2210089, dated Mar. 29, 2023, 2 pages.

*Primary Examiner* — Amit Chatly
(74) *Attorney, Agent, or Firm* — Reising Ethington P.C.

(57) ABSTRACT

A system having an extended display surface that includes a main display surface, associated with at least one screen, and at least one peripheral display surface, associated with a peripheral display element, extending around at least part of the main display surface, and one or more backlighting units configured to illuminate these display surfaces. After receiving a plurality of digital images each represented by an image data array, the system performs an extraction from the image data array, of a main image data array of dimensions equal to the dimensions of the screen, and an extraction or generation of at least one complementary image data sub-array, and a control of displaying the main image data array on the screen and controlling the backlighting units to perform a display of each complementary image data sub-array on the corresponding peripheral display element.

13 Claims, 7 Drawing Sheets

(51) Int. Cl.
*B60K 35/29* (2024.01)
*B60K 35/81* (2024.01)

(52) U.S. Cl.
CPC .... *B60K 2360/18* (2024.01); *B60K 2360/349* (2024.01); *G09G 2380/10* (2013.01)

(58) Field of Classification Search
CPC .... G09G 2380/12; B60K 35/00; B60K 35/29; B60K 35/81; B60K 2360/18; B60K 2360/349; G06F 3/1446; G06F 3/1431
See application file for complete search history.

(56) References Cited

U.S. PATENT DOCUMENTS

| | | | |
|---|---|---|---|
| 2016/0196805 A1* | 7/2016 | Chen | G06F 3/1446 345/667 |
| 2020/0150835 A1 | 5/2020 | Park et al. | |

* cited by examiner

IMAGE DISPLAY SYSTEM COMPRISING AN EXTENDED DISPLAY SURFACE, ASSOCIATED IMAGE DISPLAY METHOD, ASSOCIATED SOFTWARE AND PROGRAMMABLE ELECTRONIC DEVICE

TECHNICAL FIELD

The present invention relates to an image display system comprising an extended display surface. It also relates to a method for displaying associated images, an associated software and an associated programmable electronic device.

BACKGROUND

The invention is in the field of image display systems, and more particularly those suitable for producing an extended and immersive display of audiovisual content.

In particular, the invention applies in the field of integrating a display system of a trim element, and more particularly a vehicle trim element such as a dashboard, a central console, a seat, a door panel or other, intended to display information to the occupants of the vehicle, that is, passengers and driver, and/or audiovisual content.

It is known to integrate a display device comprising a liquid crystal or LCD (Liquid Crystal Display) screen, and a backlighting device for the screen in order to carry out a display of image data. In particular, Thin Film Transistor (TFT) technology is used to obtain good display quality.

Nevertheless, the use of a display screen of the TFT-LCD extended display surface type is expensive, and the display quality, in particular the resolution of the display, is not useful for the display of certain information intended for vehicle passengers. In a known manner, the display resolution is defined by the number of pixels per unit of length of the display surface.

There is a need to combine an extended display system, of satisfactory visual quality for the display of audiovisual content as well as information, and at reduced costs.

SUMMARY

To this end, according to one aspect, the invention proposes an image display system comprising an extended display surface comprising a main display surface and at least one peripheral display surface extending around at least part of the main display surface, said main display surface comprising at least one display screen, the or each peripheral display surface comprising a corresponding peripheral display element, the system comprising one or more backlighting units configured to illuminate the main display surface and/or said at least one peripheral display surface, the system further comprising a video data receiving module and a programmable electronic device configured to control at least one backlighting unit based on the received image data to perform an image display. Following reception of video data comprising a plurality of digital images to be displayed, each digital image being represented by an image data array, the programmable electronic device implements modules configured to:
for each digital image of said plurality, extract a main image data array from said image data array,
extract from said image data array, or generate, at least one subarray of complementary image data, each subarray of complementary image data being associated with a corresponding peripheral display element of the at least one peripheral display surface, and
control a display of the main image data array on the display screen and control at least one backlighting unit to perform a display of the or each subarray of complementary image data on the corresponding peripheral display element.

Advantageously, the proposed display system implements a display composition module that carries out, by using electronic components and software, the control of the display of the main image data array on the display screen and the control, for the or each subarray of complementary image data, of at least one backlighting unit to perform a display on a corresponding peripheral display surface.

Advantageously, the display on the extended display surface is carried out in a synchronized manner between the display on the main display surface and the or each peripheral display surface.

The image display system may also have one or more of the features hereunder, taken independently or according to all technically conceivable combinations.

When the image data array of each digital image has dimensions greater than the dimensions of the display screen, the main image data array has dimensions equal to the dimensions of the screen and said at least one subarray of complementary image data has dimensions less than or equal to the dimensions of the corresponding peripheral display element.

When the image data array of each digital image has dimensions less than or equal to the dimensions of the display screen, the main image data array has dimensions corresponding to those of the image data array of each digital image, and said at least one subarray of complementary image data has dimensions corresponding to a generated image data array, making it possible to create a backlighting effect provided to illuminate the corresponding peripheral display element.

The backlighting effect is determined by selecting an animation mode from a set of predetermined animation modes.

The programmable electronic device is a single electronic component, comprising a programmable processor configured to transmit the main image data array for display on the screen and to control at least one backlighting unit to perform a display of the or each subarray of complementary image data on the corresponding peripheral display element.

The programmable electronic device comprises a main programmable logic component and a secondary programmable logic component, wherein the main programmable logic component is configured to transmit the main image array to the screen and to transmit the or each complementary image data subarray to the secondary programmable logic component, and wherein said secondary programmable logic component is configured to control the or each backlighting unit for displaying the or each complementary image data subarray on the corresponding peripheral display element.

According to another aspect, the invention relates to a method for displaying images implemented in an image display system comprising an extended display surface comprising a main display surface and at least one peripheral display surface extending around at least part of the main display surface, said main display surface comprising at least one display screen, the or each peripheral display surface comprising a corresponding peripheral display element, the system comprising one or more backlighting units configured to illuminate the main display surface and said at least one peripheral display surface, the system further comprising a video data receiving module and a programmable electronic device configured to control at least one backlighting unit based on the received image data to perform an image display. The method is implemented by the programmable electronic device and comprises the following steps:

receiving video data comprising a plurality of digital images to be displayed, each digital image being represented by an image data array, for each digital image of said plurality, extracting from the image data array a main image data array of dimensions equal to the dimensions of the screen, and extracting or generating at least one subarray of complementary image data, each subarray of complementary image data being associated with a corresponding peripheral display element of the at least one peripheral display surface, controlling the display of the main image data array on the display screen, and controlling, for the or each subarray of complementary image data, at least one backlighting unit to perform a display on the corresponding peripheral display element.

The advantages of the image display method are similar to the advantages of the audio processing method recalled hereinbefore.

The image display method may also have one or more of the features hereunder, taken independently or according to all technically conceivable combinations.

The method comprises, according to a first operating mode, when each digital image is an extended digital image represented by an image data array of larger dimensions than the dimensions of the display screen, a step of cutting the data array into a main image data array of dimensions equal to the dimensions of the screen and at least one subarray of complementary image data, by applying a predefined cutting structure.

The method comprises, according to a second operating mode, receiving video data comprising a plurality of digital images to be displayed, each digital image being represented by an image data array of dimensions less than or equal to the dimensions of the display screen, and for each digital image of said plurality, a step of generating at least one subarray of complementary image data, each subarray of complementary image data being associated with the corresponding peripheral display element, and having dimensions chosen as a function of the one or more backlighting units intended to illuminate said peripheral display surface.

According to another aspect, the invention relates to a computer program or software comprising code instructions which, when executed by a programmable electronic device, implement an image display method as briefly described above.

According to another aspect, the invention relates to a programmable electronic device, said programmable electronic device being a single electronic component comprising a programmable processor configured to implement an image display method as briefly described above.

BRIEF DESCRIPTION OF THE DRAWINGS

Other features and advantages of the invention will become apparent from the description given hereunder, by way of non-limiting indication, referring to the appended figures, among which.

DETAILED DESCRIPTION

An embodiment of the invention will be described below in its application in information and entertainment systems on board a vehicle.

Figure 1:
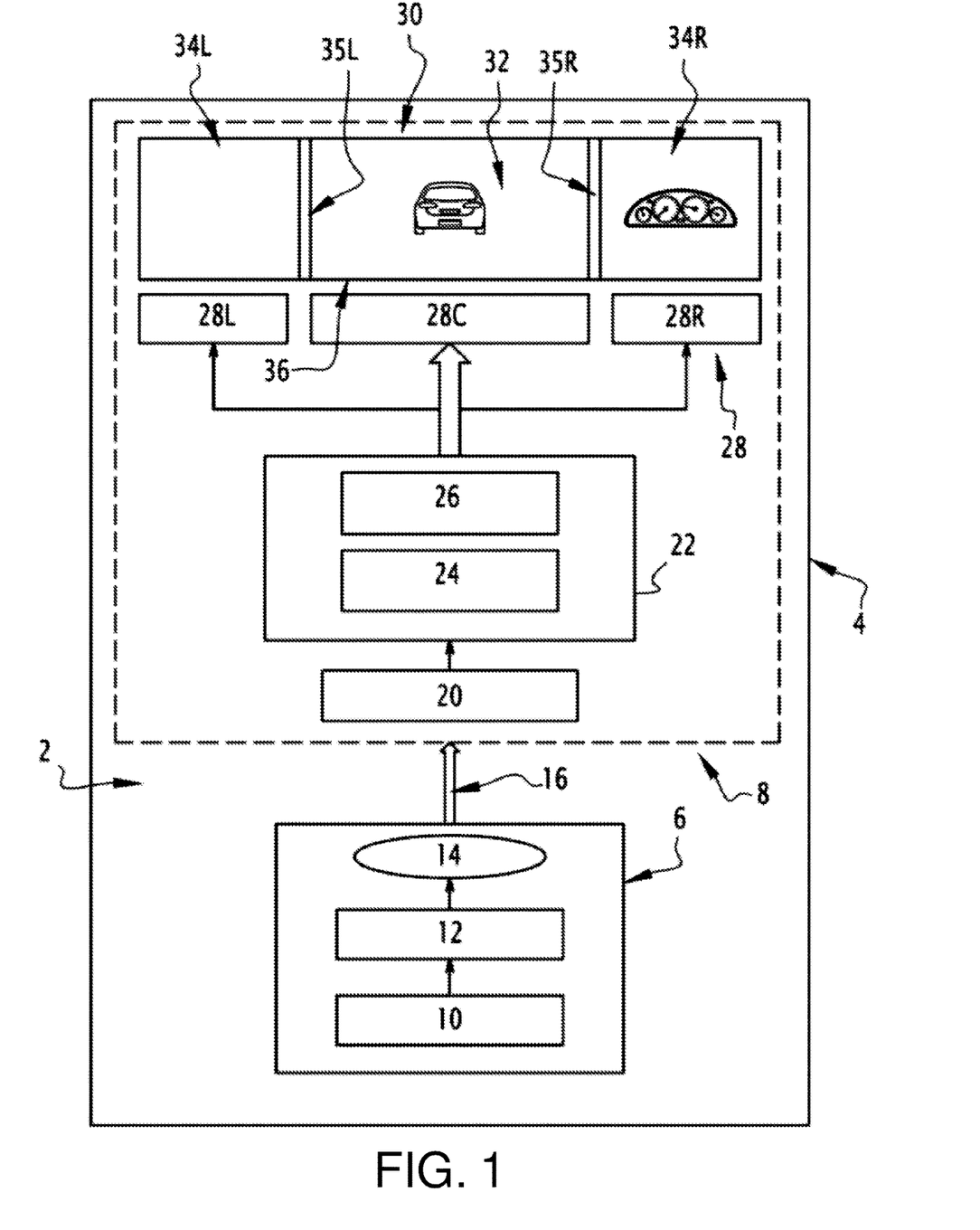
FIG. 1 schematically shows an information and entertainment system comprising an image display system according to one embodiment.

FIG. 1 schematically shows an information and entertainment system 2, on board a vehicle 4, also called an IVI system ("In-Vehicle Infotainment").

For example, the information and entertainment system 2 is integrated into a trim element of the vehicle 4, for example a dashboard, a central console, a seat, a door panel or other.

The information and entertainment system 2 is shown in simplified form, only the functional elements relating to the display system of the information and entertainment system 2 being described and shown.

The information and entertainment system 2 comprises a system 6 for providing video data to be displayed, the video data comprising a plurality of digital images, and an image display system 8.

In a known manner, video data are formed by a plurality of successive images, at a given rate. The rate, which is the number of images per second, expressed in Hertz or in FPS (Frames per Second).

Each digital image is represented by a pixel array, also called image elements or image data, defined by its respective dimensions, which are a number of rows and a number of columns.

The system 6 for providing video data to be displayed comprises a computing module 10 which implements a generation of a plurality of digital images to be displayed, and a module 12 for shaping the digital image data, in the form of video data 14, called serialized data, suitable for the transmission of video data to the display system 8, via a dedicated link 16.

The video data 14, in the form of binary streams, are transmitted via the dedicated link 16 to the display system 8.

Several modes of generating video data are envisaged as described in more detail below.

The display system 8 comprises a module 20 for receiving video data, also called de-serialization module, which transforms serialized video data received in the form of binary streams into successive digital images.

The display system 8 further comprises a programmable electronic device 22.

In one embodiment, the programmable electronic device 22 is made in the form of a single programmable logic component, such as an FPGA (Field Programmable Gate Array), or in the form of a dedicated Integrated circuit, such as an ASIC (Application Specific Integrated Circuit).

In another embodiment, described in more detail below with reference to FIG. 2, the programmable electronic device 22 is embodied as a plurality of programmable logic components, for example an FPGA and a microcontroller separate from the FPGA, functionalities implemented by the programmable electronic device 22 being distributed over programmable logic components.

The display system 8 further comprises backlighting units 28 and an extended display surface 30, comprising a main display surface 32 and one or more peripheral display surfaces 34.

Each peripheral display surface comprises a corresponding peripheral display element.

In the example of FIG. 1, the extended display surface 30 comprises two peripheral display surfaces, respectively 34R and 34L, the peripheral display surface 34R being arranged around the right lateral edge 35R of the main display surface 32, the peripheral display surface 34L being arranged around the left lateral edge 35L of the main display surface 32. In one embodiment, the peripheral display surface 34R is attached to the right lateral edge of the main display surface, and the peripheral display surface 34L is attached to the left lateral edge of the main display surface. It should also be noted that these surfaces are represented schematically as being separated, but in practice they are arranged so as to form a visual continuum for a user, e.g., a passenger of the vehicle.

More generally, the extended display surface 30 comprises any number S of peripheral display surfaces, each peripheral display surface extending around at least part of the main display surface.

For example, according to another embodiment, the extended display surface 30 comprises a main display surface and a peripheral display surface extending all around the main display surface, in other words forming a border around the main display surface.

The backlighting units 28 are configured to illuminate, on command, the main display surface 32 and at least one peripheral display surface 34, so as to emit light signals on each of said surfaces, and consequently perform a display of extended digital images.

A display screen 36, which is combined with the main display surface 32 in the representation of FIG. 1, extends opposite the main display surface.

The display screen 36 is for example formed by a liquid crystal panel arranged to form an image when the panel is illuminated and controlled.

The or each peripheral display surface 34 is formed by a corresponding peripheral display element, merged with the peripheral display surface in the example of FIG. 1, preferably transparent, for example formed by a window or a lens made of plastic, glass or other material.

In one embodiment, the extended display surface 30 is formed by a single transparent material layer, the main display surface 32 being formed by the part of the transparent material layer that extends opposite the screen 36, each peripheral display surface 34 being formed by the same layer of transparent material, around the main display surface 32 according to the provided arrangement.

According to another embodiment, the main display surface 32 is formed by the panel of the screen 36, the peripheral display surfaces 34 being display elements made of transparent material positioned around the edges of the screen 36.

In the example of FIG. 1, the backlighting units 28 are respectively represented in three groups, which are the backlighting units 28R adapted to illuminate the peripheral display surface 34R, the backlighting units 28L adapted to illuminate the peripheral display surface 34L and the backlighting units 28C adapted to illuminate the main display surface 32.

In one embodiment, the respective backlighting units 28R, 28L, 28C form part of a layer of light-emitting diodes (or LEDs) forming a light layer 28 adapted to illuminate the extended display surface 30 as a whole, the light-emitting diodes forming an array of light-emitting diodes.

In one embodiment, the diode array defines a plurality of subarrays of diodes which can be activated independently of one another and/or which can each emit a light signal identical to and/or different from the light signals emitted by the other subarrays according to the technology described in patent application FR 21 04686.

In another embodiment, the backlighting unit 28C is a backlighting unit dedicated to the display screen 36, which can be integrated with the liquid crystal panel to form an LCD lighting device, and the backlighting units 28R, 28L are separately activatable light emitting diode arrays.

The display system 2 advantageously makes it possible to display images, and in particular successions of images at a given rate forming a video, on the extended display surface 30.

The programmable electronic device 22 is configured to execute a display composition module 24 and a control module 26 of backlighting unit(s) 28 for display of images on the extended display surface 30.

Upon reception of video data comprising a plurality of digital images to be displayed, each digital image being represented by an image data array, the display composition module 24 is configured to, for each digital image of said plurality, extract a main image data array from the image data array received from the receiving module 20.

In addition, the display composition module 24 is configured to obtain one or more subarrays of complementary image data, either by extraction from the image data array received, according to a first operating mode, or by generating complementary image data, according to a second operating mode, each subarray of complementary image data being associated with a peripheral display element corresponding to a peripheral display surface.

These operating modes are described in detail below.

The main data array is transmitted to the control module 26 for display on the main display surface 32. The or each subarray of complementary image data is transmitted to the control module 26, this module controlling one or more backlighting units in order to perform a display on a peripheral display element corresponds to a peripheral display surface.

Several embodiments of the display composition module 24 and backlighting unit control module 26 are described below.

In one embodiment, the modules 24 and 26 are produced in the form of executable software, comprising code instructions executable by the programmable electronic device 22 in order to implement a display method as described below.

Alternatively, the modules 24 and 26 are each made in the form of a programmable logic component or dedicated integrated circuit.

Figure 2:
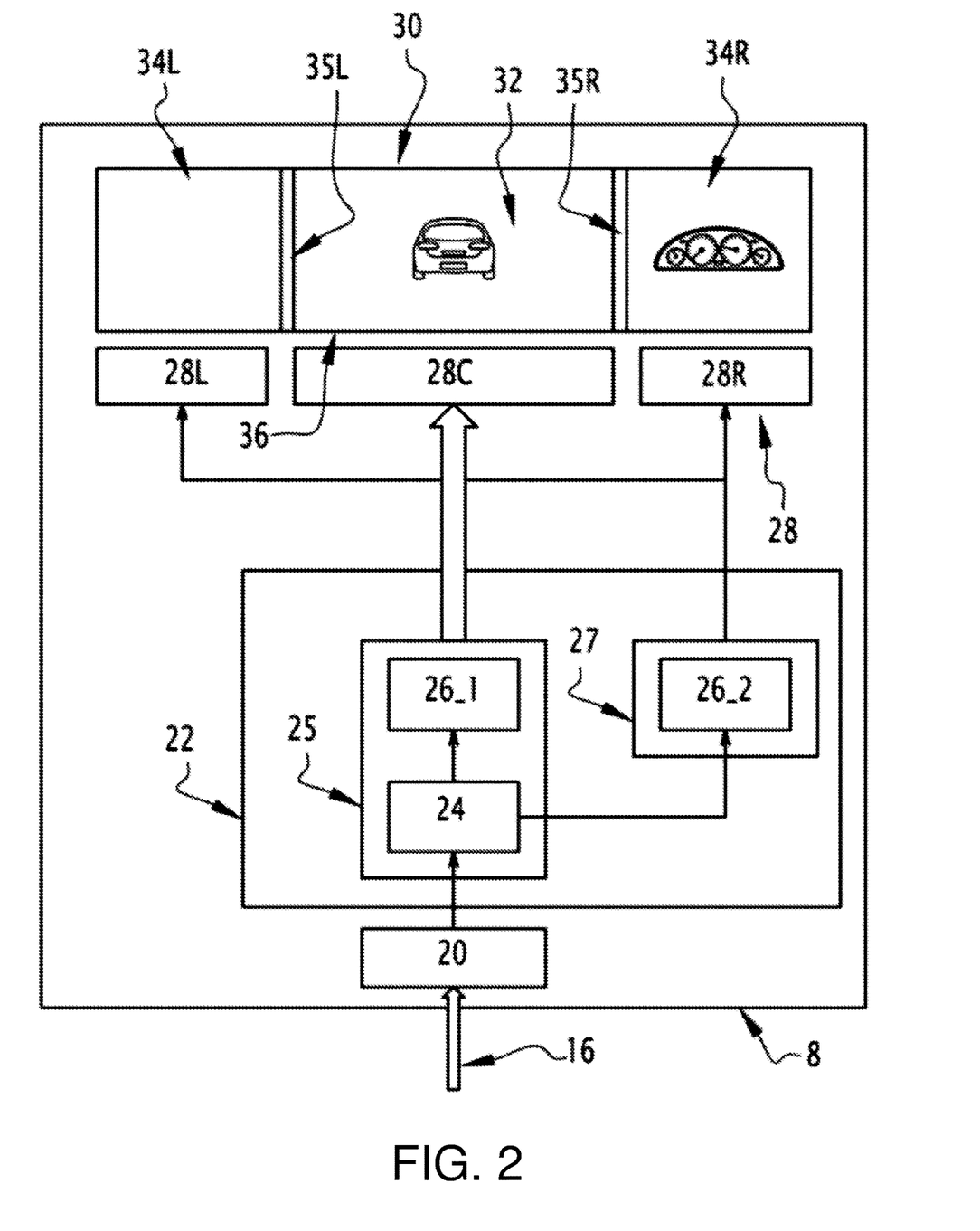
FIG. 2 schematically shows a variant of the image display system of FIG. 1.

Another embodiment of the image display system 8 is shown in FIG. 2. The elements common to those of FIG. 1 bear the same reference number.

In this embodiment, the programmable electronic device 22 is made in the form of several programmable logic components, for example a main programmable logic component 25, for example an FPGA, and a secondary programmable logic component 27, for example a microcontroller, separate from the FPGA. In this embodiment, the main programmable logic component 25 implements the display composition module 24 which is configured to obtain the main image data array and the complementary image data subarray(s).

The main array of image data is transmitted to the control module 26_1, configured to illuminate the backlighting units 28C of the main display surface.

The or each subarray of complementary image data is transmitted by the main programmable logic component 25 to the secondary programmable logic component 27, which implements a module 26_2 which controls the activation of backlighting units 28, for example 28L and 28R, for the display of data on the respective peripheral display surfaces 34L and 34R.

A first operating mode implemented by the image display system 8 will be described with reference to FIGS. 3 to 6.

In this first operating mode, the video data to be displayed provided to the display system 8 contain digital images of larger size than the size of the LCD display screen, and comprise both image data to be displayed on the main display surface and data to be displayed on the or each peripheral display surface.

The size of the display screen is defined by the maximum number of light points (or pixels) that can be displayed on the screen, by row and by column.

A digital image is represented by an image data array or pixels, its size is defined by the number of pixels, expressed as number M of pixels per column and number N of pixels per row.

Figure 3:
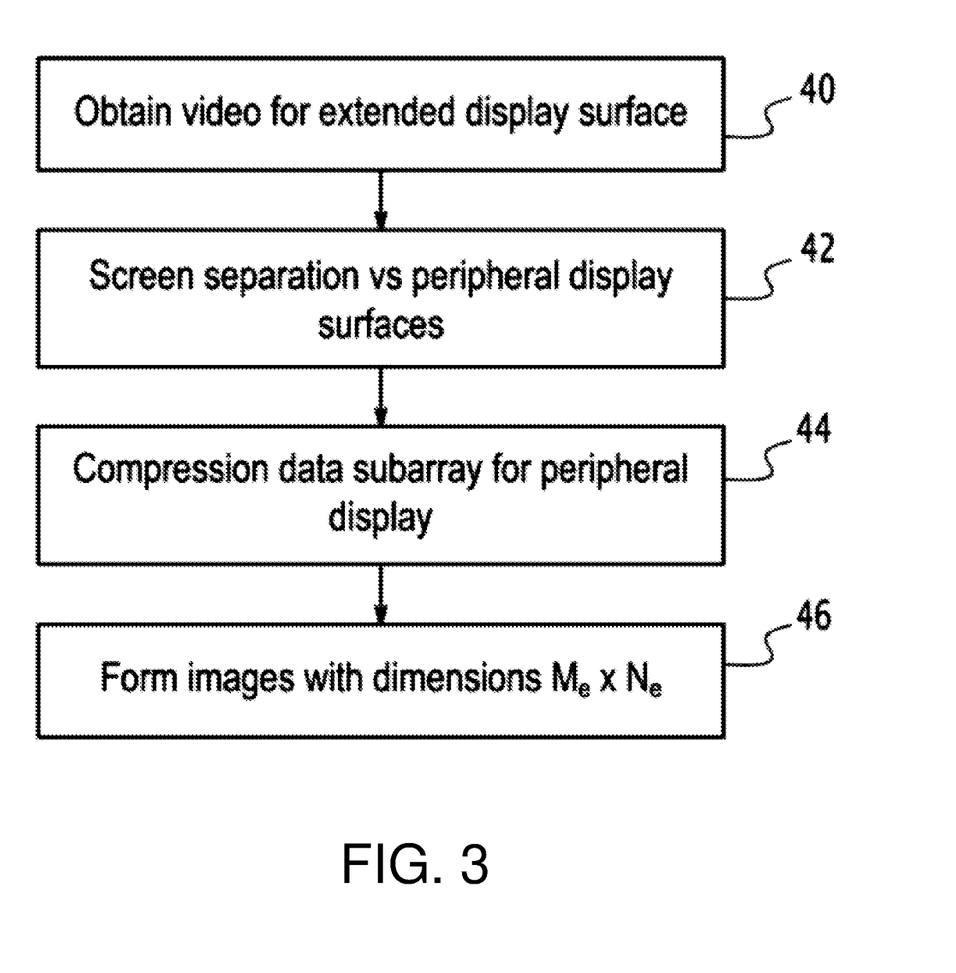
FIG. 3 is a block diagram of the main steps of a method for generating extended display images.

FIG. 3 is a flowchart of the main steps of generating a video comprising a plurality of extended digital images to be displayed, for example implemented by the image generation module 10 of the video delivery system.

Figure 4:
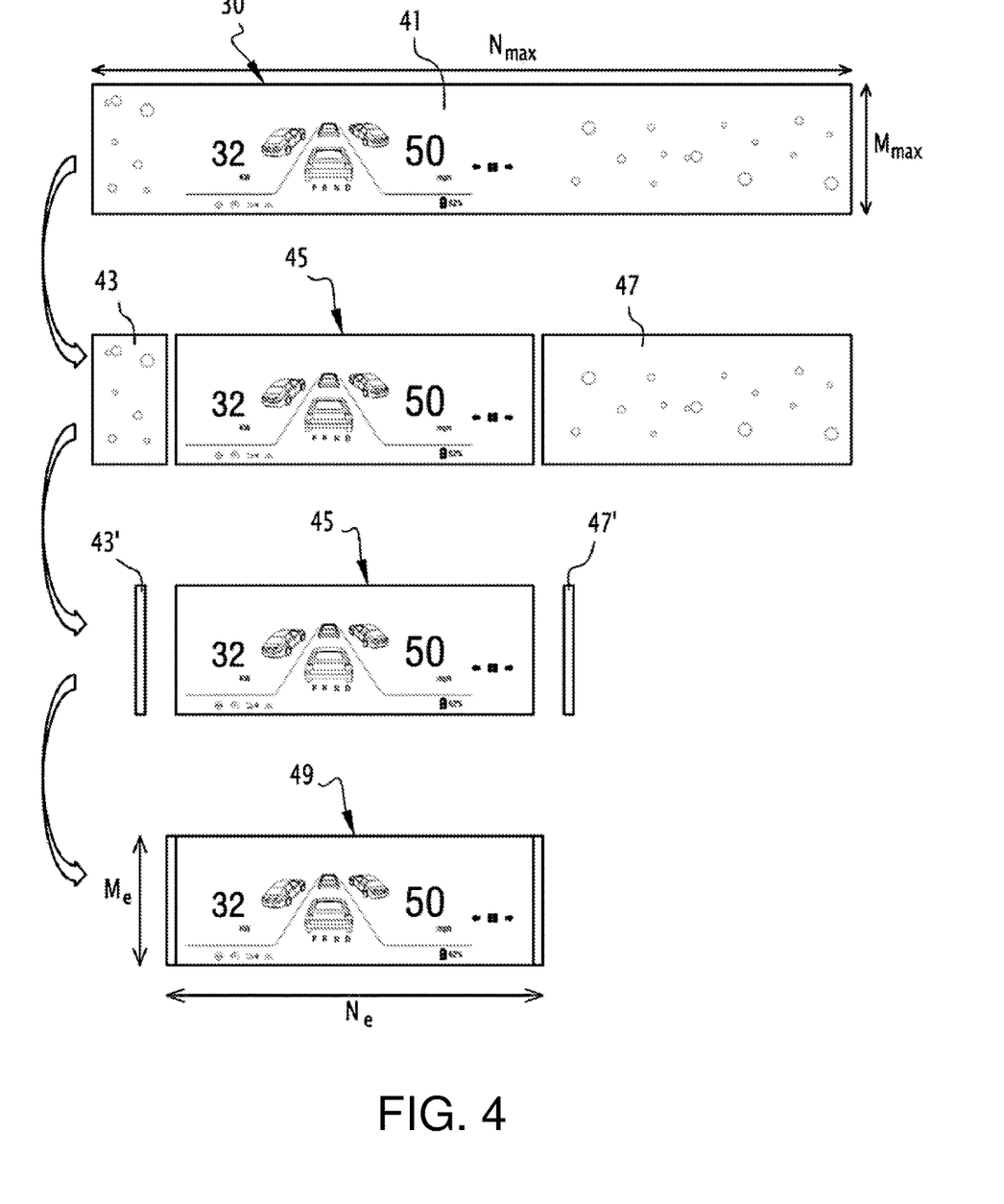
FIG. 4 is an illustration of the results, step by step, of the image generation method.

FIG. 4 shows an example of a corresponding image.

The method comprises a step 40 of obtaining a video containing a plurality of images intended for display on the extended display surface.

In the example of FIG. 4, the extended display surface 30 is rectangular in shape and having dimensions $M_{max}$ pixels per column and $N_{max}$ pixels per row (in other words an array of $M_{max}$ rows and $N_{max}$ columns), the digital image 41 shown by way of example extending over the entire extended display surface.

The method then comprises a step 42 of separating the part (e.g., array of pixels) of each digital image of the video to be displayed on the screen opposite the main display surface, with a first resolution, and parts to be displayed on the peripheral display elements corresponding to the peripheral display surfaces.

The display on the screen is for example a first resolution display, and the displays on the display elements corresponding to the peripheral display surfaces are second resolution displays, the first resolution being greater than the second resolution.

FIG. 4 shows the result of step 42, which comprises an image part 45 to be displayed on the screen, and image portions 43, 47 to be displayed respectively on the peripheral display elements corresponding to the peripheral display surfaces 34L, 34R.

For example, the image part 45 is defined by a main image data array, for example of dimensions $M_c \times N_c$, the image part 43 by an array of dimensions $M_{P1} \times N_{P1}$ and the image part 47 by an array of dimensions $M_{P2} \times N_{P2}$.

In this embodiment, the first resolution is the maximum resolution of the display screen, denoted $M_c \times N_c$. Peripheral display elements are rectangular and have respective dimensions $M_{P1} \times N_{P1}$ and $M_{P2} \times N_{P2}$.

The method comprises, after step 42, a step 44 of compressing the arrays representing the image parts to be displayed on the peripheral display surfaces, depending on the dimensions of the LED subarrays of the lighting units of the respective peripheral display surfaces.

In one embodiment, the array of dimensions $M_{P1} \times N_{P1}$ is compressed into a subarray of dimensions $M_{L1} \times N_{L1}$, with at least $M_{L1} < M_{P1}$ or $N_{L1} < N_{P1}$, and similarly the array of dimensions $M_{P2} \times N_{P2}$ is compressed into a subarray of dimensions $M_{L2} \times N_{L2}$, with at least $M_{L2} < M_{P2}$ or $N_{L2} < N_{P2}$.

This compression reduces the resolution of the images to be displayed on the peripheral display surfaces 34L, 34R, to dimensions $M_{L1} \times N_{L1}$ and $M_{L2} \times N_{L2}$ that are suitable for these display surfaces.

The dimensions of the compressed arrays, respectively $M_{L1} \times N_{L1}$ and $M_{L2} \times N_{L2}$ in the example, can be defined in several ways.

In one embodiment, the dimensions of these compressed subarrays are connected to the structure of the array of the LEDs to be activated (e.g., identical number of columns).

In another embodiment, the dimensions of the compressed subarrays are defined differently, for example by choosing for each peripheral display surface, a satisfactory number of columns in order to contain all the information of the array of the LEDs and which may differ from the number of columns $N_{P1}$ and $N_{P2}$.

Of course, the choice of the dimensions of the compressed subarray may vary for each peripheral display surface.

In other words, because the resolution of each display surface is different, it is possible to present the data of the peripheral (or secondary) display surfaces, which have second resolutions lower than the first resolution of the main display surface, by subarrays which have smaller dimensions, without losing the useful information of the LEDs of these peripheral display surfaces. This makes it possible to represent the arrays $M_{P1} \times N_{P1}$ and $M_{P2} \times N_{P2}$ by arrays that have smaller dimensions $M_{L1} \times N_{L1}$ and $M_{L2} \times N_{L2}$, therefore to perform a compression of the image data.

Advantageously, the compression makes it possible to limit the bit rate of the data to be transmitted over the dedicated video link 16, while allowing an extended display of satisfactory resolution.

The result of this step 44 is also shown in FIG. 4, where the image portions 43', 47' corresponding respectively to the image portions 43, 47 are shown after compression.

The method then comprises a step 46 of forming extended digital images of dimension $M_e \times N_e$. For each digital image of the video, an extended digital image is formed by concatenation of the arrays and subarrays obtained after the preceding steps 42 and 44: the compressed subarrays containing the pixels intended for the display on the peripheral display surfaces and the main image data array intended for the display on the main display surface (e.g., on the LCD screen).

In the example shown in FIG. 4, the extended digital image 49 comprises a total of $N_e$ columns, formed by $N_{L1}$ columns of the subarray representing the image part 43', $N_c$ columns of the main array and $N_{L2}$ columns of the subarray representing the image part 47', all the arrays comprising the same number of rows.

Figure 5:
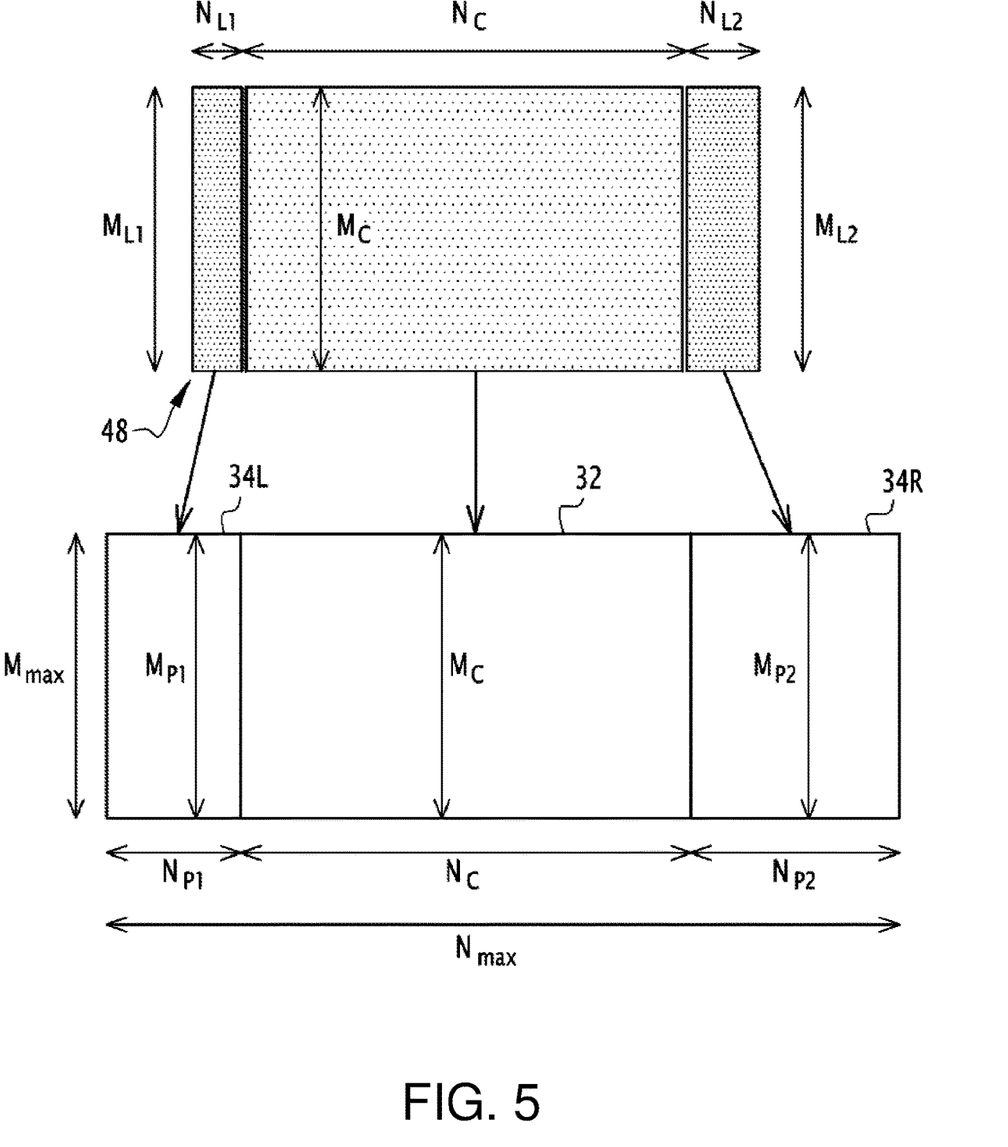
FIG. 5 is a representation of a cutting structure and associated display surfaces.

Thus, in this embodiment in which the extended display surface comprises a main display surface 32 and two peripheral display surfaces 34L, 34R, on either side of the main display surface, each extended digital image comprises image data composed according to the cutting structure (or template) 48 shown in FIG. 5.

This cutting structure 48 defines the main array and the subarrays of complementary image data forming the extended digital image.

FIG. 5 further shows the correspondence between each array/subarray and a corresponding display surface.

Of course, it is an example of a cutting structure, other arrangements being conceivable according to the number of peripheral display surfaces and their arrangement relative to the main display surface.

A video comprising a plurality of digital images to be displayed, which are extended digital images formed as explained above is provided at the input of the display system 8.

Figure 6:
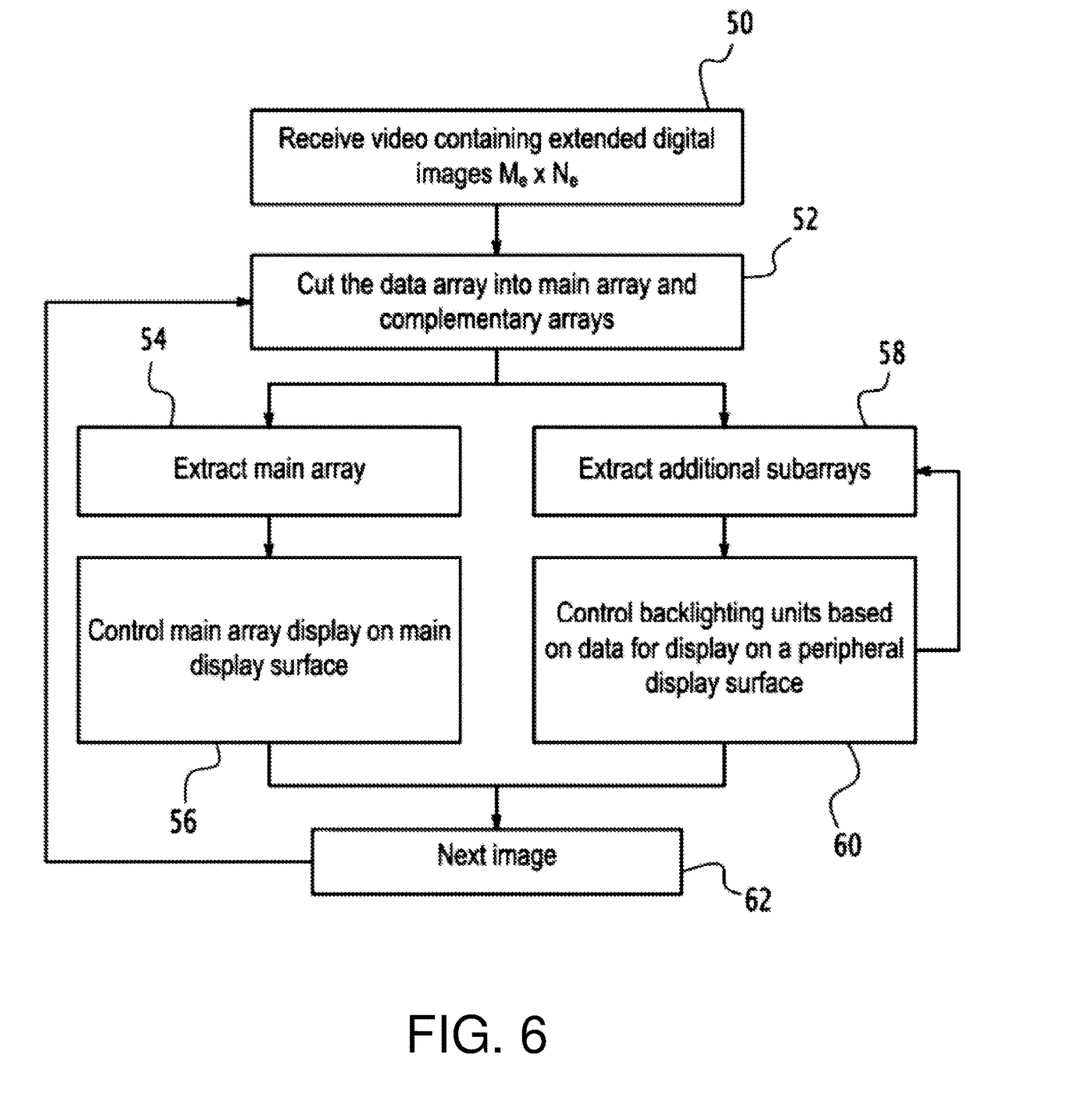
FIG. 6 is a block diagram of the main steps of the image display method according to a first embodiment.

FIG. 6 is a flowchart of the main steps of the image display method, implemented by the programmable electronic device 22, in this first operating mode.

The method comprises a step 50 of receiving video data comprising a plurality of extended digital images, each extended digital image having $M_e$ rows and $N_e$ columns, at least one of the dimensions $M_e$ or $N_e$ being greater than the corresponding dimension $M_c$ or $N_c$ of the main display surface. In other words, $M_e \geq M_c$ and/or $N_e \geq N_c$.

In other words, the product $M_e \times N_e$ (size in pixels of the extended digital image) is greater than the product $M_c \times N_c$ (size in pixels of the main display surface).

The method then comprises, for each digital image represented by an array of pixels, of size $M_e \times N_e$, a step 52 of cutting the array into a main image data array of dimensions equal to the dimensions of the screen ($M_c \times N_c$) and at least one subarray of complementary image data, by applying a predefined cutting structure.

Each subarray of complementary data has dimensions $M_{L1} \times M_{N1}$, $M_{L2} \times N_{L2}$, obtained following the compression step 44.

Referring to the example of FIGS. 4 and 5, the cutting structure 48 is applied, this cutting structure being an array template.

For example, a description of the cutting structure is previously recorded, for example in the form of pixel coordinates, in the array cutting structure 48, in order to distinguish the pixels belonging to each respective subarray. In particular, in an extended array the cutting structure defines coordinates of pixels corresponding to the main display surface forming the main array and coordinates of pixels corresponding to each peripheral display surface, each peripheral display surface having an associated subarray.

For example, the cutting structure is predetermined, the parameters defining it being pre-recorded.

Alternatively, the cutting structure to be applied to the cutting step 52 is transmitted in the data binary streams containing the plurality of extended digital images.

The method comprises an extraction 54, from the image data array received, of a main image data array and a control 56 for displaying this main array of the data on the main display surface.

For example, the control 56 consists in transmitting the main data array for display on the LCD screen via LVDS (Low Voltage Differential Signaling).

In one embodiment, the control 56 consists in controlling backlighting units adapted to illuminate the screen 36 located opposite the main display surface 32 for the display of a first light signal corresponding to the main data array.

The method further comprises extracting 58 the or each subarray of complementary image data and a control 60 of one or more backlighting units based on the data of the complementary subarray to illuminate a corresponding peripheral display surface.

Each subarray of complementary image data comprises data adapted to control the illumination of one or more backlighting units, each formed of an array of light-emitting diodes.

Preferably, steps 54 and 58 are carried out substantially in parallel, as well as steps 56 and 60 of display control which are carried out substantially in parallel, which ensures a synchronization of the displays on the main display surface and on the peripheral display surfaces.

The display controls 56, 60 are followed by the change to the next digital image to be displayed (step 62).

Thus, in the first operating mode, when each digital image is an extended digital image, represented by an image data array of larger dimensions than the dimensions of the display screen, the display composition module 24 is configured to cut the data array into a main image data array of dimensions equal to the dimensions of the screen and at least one subarray of complementary image data, by applying a predefined cutting structure.

Figure 7:
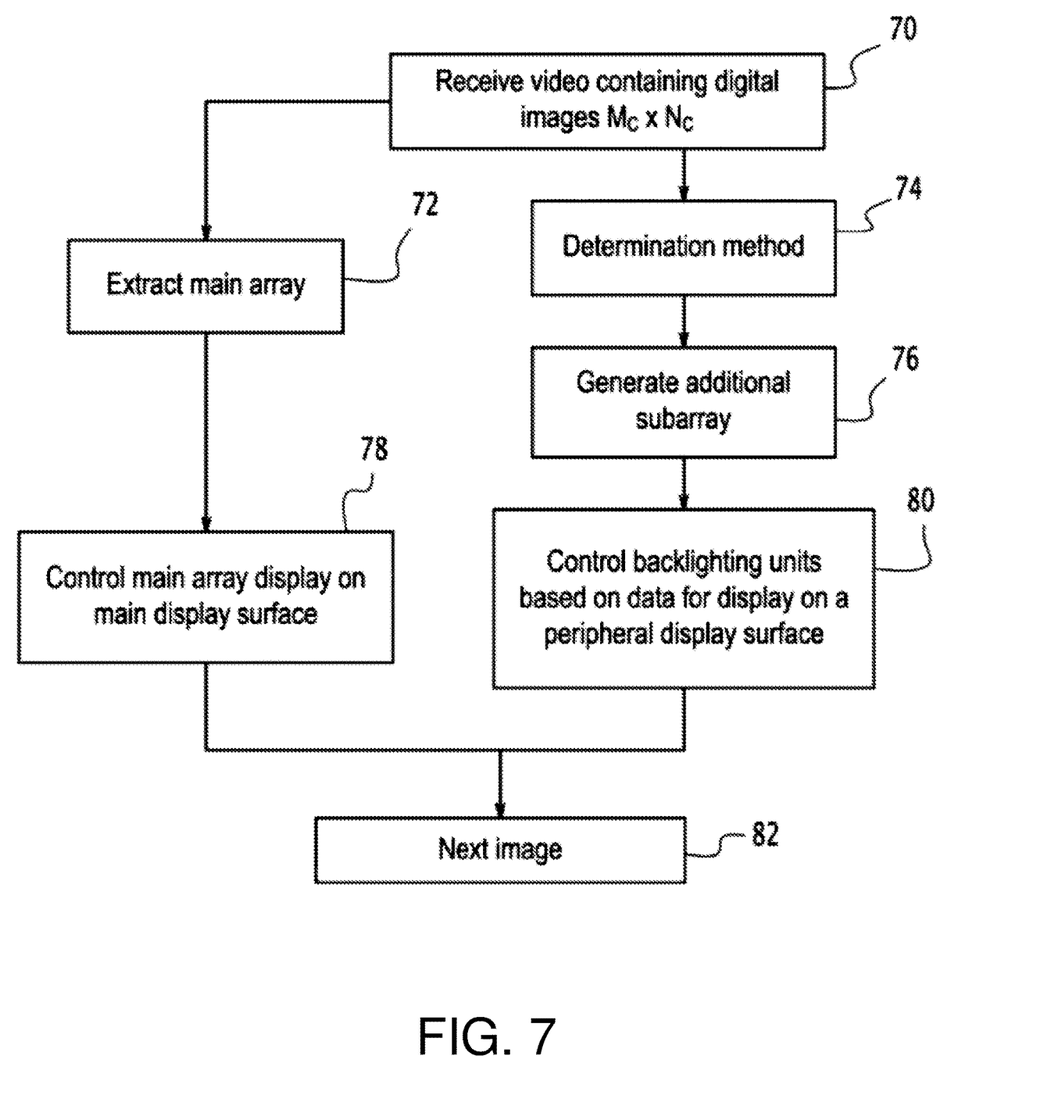
FIG. 7 is a block diagram of the main steps of the image display method according to a first embodiment.

A second operating mode implemented by the image display system 8 will be described with reference to FIG. 7.

The method comprises, in the second operating mode, a step 70 of receiving video data containing a plurality of digital images of dimensions intended for display on the LCD screen, e.g., $M_c$ rows and $N_c$ columns.

According to one variant, each digital image has dimensions smaller than the dimensions of the display screen.

In other words, in the second operating mode, each received digital image is represented by an image data array of dimensions less than or equal to the dimensions of the display screen.

Thus, in this second operating mode, the video data are in conventional format, and are obtained by a method for generating a video comprising a plurality of extended digital images as described with reference to FIG. 3.

The method implements additional steps for performing a display on the extended display surface of the display system, with backlighting effects on the complementary display surface(s), or on at least part of the complementary display surfaces.

The method comprises, for each digital image received, a step 72 of extracting the main data array for display on the LCD screen, the main data array being equal to the image data array.

The method further comprises a step 74 of determining a method for generating subarrays of complementary image data to be applied. For example, several data generation methods, each corresponding to an intended animation mode, are previously recorded, and one of these methods is chosen.

In one embodiment, each subarray of complementary image data corresponds to an image data array generated to create a backlighting effect intended to illuminate said corresponding peripheral display surface.

For example, the backlighting effect is determined in step 74 by selecting an animation mode from a set of predetermined animation modes.

For example, the determination 74 is carried out following an external order.

Step 74 is followed by a step 76 of generating one or more complementary image subarray(s), each subarray being associated with a peripheral display element of a corresponding peripheral display surface.

In one embodiment, a cutting structure similar to the cutting structure 48 is applied in order to define the dimensions of the complementary image data subarrays to be generated, each subarray of complementary image data being of dimensions compatible with the dimensions of the light-emitting diode arrays forming the one or more backlighting units of the corresponding peripheral display surface.

According to variants, the dimensions of the subarrays are chosen as a function of the chosen backlighting effect.

The main array of image data is used to control (step 78) the display on the screen, in the main display surface.

Each subarray of complementary image data is provided to control (step 80) the backlighting units of the corresponding peripheral display surfaces, in order to obtain the desired backlighting effect.

Thus, an extended digital image display is obtained on the extended display surface comprising the received digital image, displayed with a first resolution on the screen opposite the main display surface, and animation effects on the or each peripheral display surface with a second resolution, generally lower than the first resolution.

The method described makes it possible, in each of the embodiments described, to obtain an extended display that is immersive and satisfactory for the user, e.g., a passenger of the vehicle, by virtue of the display composition retaining the continuity between main display surface and peripheral display surfaces.

According to one variant, the programmable electronic device of the display system is configured to determine, from the dimensions of the digital images received or from an external order, which operating mode to implement, between the first operating mode described with reference to FIGS. 3 to 6 and the second operating mode described with reference to FIG. 7.

The invention claimed is:

1. An image display system comprising an extended display surface comprising a main display surface and at least one peripheral display surface extending around at least a part of the main display surface, said main display surface comprising at least one display screen, the or each peripheral display surface comprising a corresponding peripheral display element, the system comprising one or more backlighting units configured to illuminate the main display surface and/or said at least one peripheral display surface, the system further comprising a video data receiving module and a programmable electronic device configured to control at least one backlighting unit based on the received image data to perform an image display,
wherein, following reception of video data comprising a plurality of digital images to be displayed, each digital image being represented by an image data array, the programmable electronic device implements modules configured to:
for each digital image of said plurality, extract a main image data array from said image data array,
generate at least one subarray of complementary image data, each subarray of complementary image data being associated with the corresponding peripheral display element of the at least one peripheral display surface, and
control a display of the main image data array on the display screen and control at least one backlighting unit to perform a display of the or each subarray of complementary image data on the corresponding peripheral display element to create a backlighting effect intended to illuminate the corresponding peripheral display element,
wherein the display on the display screen has a first resolution of number of pixels per length unit of a display surface, and the display of the or each subarray of complementary image data on the corresponding peripheral display element has a second resolution of number of pixels per length unit of a display surface, the first resolution being higher than the second resolution.

2. The system according to claim 1, when the image data array of each digital image has dimensions greater than the dimensions of the display screen, the main image data array has dimensions equal to the dimensions of the screen and said at least one subarray of complementary image data has dimensions less than or equal to the dimensions of the corresponding peripheral display element.

3. The system according to claim 1, when the image data array of each digital image has dimensions less than or equal to the dimensions of the display screen, the main image data array has dimensions corresponding to those of the image data array of each digital image, and wherein each subarray of complementary image data is associated with the corresponding peripheral display element and has dimensions chosen as a function of the one or more backlighting units intended to illuminate said at least one peripheral display surface.

4. The system according to claim 1, wherein said backlighting effect is determined by selecting an animation mode from a set of predetermined animation modes, each animation mode corresponding to a process for generating complementary image data.

5. The system according to claim 1, wherein the programmable electronic device is a single electronic component, comprising a programmable processor configured to transmit the main image data array for display on the screen and to control at least one backlighting unit in order to perform a display of the or each subarray of complementary image data on the corresponding peripheral display element.

6. The system according to claim 1, wherein said programmable electronic device comprises a main programmable logic component and a secondary programmable logic component, distinct from the main programmable logic component, wherein the main programmable logic component is configured to transmit the main image array to the screen and to transmit the or each complementary image data subarray to the secondary programmable logic component, and wherein said secondary programmable logic component is configured to control the or each backlighting unit for displaying the or each complementary image data subarray on the corresponding peripheral display element.

7. A method for displaying images implemented in an image display system comprising an extended display surface comprising a main display surface and at least one peripheral display surface extending around at least a part of the main display surface, said main display surface comprising at least one display screen, the or each peripheral display surface comprising a corresponding peripheral display element, the system comprising one or more backlighting units configured to illuminate the main display surface and said at least one peripheral display surface, the system further comprising a video data receiving module and a programmable electronic device configured to control at least one backlighting unit based on the received image data to perform an image display, the method being implemented by the programmable electronic device and comprising the following steps:

receiving video data comprising a plurality of digital images to be displayed, each digital image being represented by an image data array, for each digital image of said plurality, extracting from the image data array, a main image data array of dimensions equal to the dimensions of the screen, and generating at least one subarray of complementary image data, each subarray of complementary image data being associated with a corresponding peripheral display element of the at least one peripheral display surface, controlling the display of the main image data array on the display screen, and controlling for the or each subarray of complementary image data, at least one backlighting unit in order to perform a display on the corresponding peripheral display element to create a backlighting effect intended to illuminate the corresponding peripheral display element, wherein the display on the display screen has a first resolution of number of pixels per length unit of a display surface, and the display of the or each subarray of complementary image data on the corresponding peripheral display element has a second resolution of number of pixels per length unit of a display surface, the first resolution being higher than the second resolution.

8. The method according to claim 7, comprising, according to a first operating mode, when each digital image is an extended digital image represented by an image data array of larger dimensions than the dimensions of the display screen, a step of cutting the data array into a main image data array of dimensions equal to the dimensions of the screen.

9. The method according to claim 7, comprising, according to a second operating mode, receiving video data comprising a plurality of digital images to be displayed, each digital image being represented by an image data array of dimensions less than or equal to the dimensions of the display screen, and for each digital image of said plurality, a step of generating at least one subarray of complementary image data, each subarray of complementary image data being associated with the corresponding peripheral display element, and having dimensions chosen as a function of the one or more backlighting units intended to illuminate said peripheral display surface.

10. A non-transitory, computer-readable medium having stored thereon software comprising code instructions which, when executed by a programmable electronic device, implement the method of claim 7.

11. A programmable electronic device, said programmable electronic device being a single electronic component comprising a programmable processor configured to implement the method of claim 7.

12. The system according to claim 3, wherein each subarray of complementary image data is associated with a matrix of LEDs, and wherein the dimensions of each subarray are equal to the dimensions of associated matrix of LEDs.

13. An image display system comprising an extended display surface comprising a main display surface and at least one peripheral display surface extending around at least a part of the main display surface, said main display surface comprising at least one display screen, the or each peripheral display surface comprising a corresponding peripheral display element, the system comprising one or more backlighting units configured to illuminate the main display surface and/or said at least one peripheral display surface, the system further comprising a video data receiving module and a programmable electronic device configured to control at least one backlighting unit based on the received image data to perform an image display, wherein, following reception of video data comprising a plurality of digital images to be displayed, each digital image being represented by an image data array, the programmable electronic device implements modules configured to:

for each digital image of said plurality, extract a main image data array from said image data array, extract from the image data array at least one subarray of complementary image data, each subarray of complementary image data being associated with the corresponding peripheral display element of the at least one peripheral display surface, each peripheral display surface being lit by one or several subarrays of backlighting units;

and compress the at least one subarray of complementary image data depending on the dimensions of subarrays of the backlighting units of the respective peripheral display surfaces, control a display of the main image data array on the display screen and control at least one backlighting unit to perform a display of the or each subarray of complementary image data on the corresponding peripheral display element to create a backlighting effect intended to illuminate the corresponding peripheral display element, wherein the display on the display screen has a first resolution of number of pixels per length unit of a display surface, and the display of the or each subarray of complementary image data on the corresponding peripheral display element has a second resolution of number of pixels per length unit of a display surface, the first resolution being higher than the second resolution.

* * * * *